F. HELDER.
TURN TABLE ATTACHMENT FOR AUTOMOBILES.
APPLICATION FILED JAN. 24, 1912.
1,061,073.
Patented May 6, 1913.
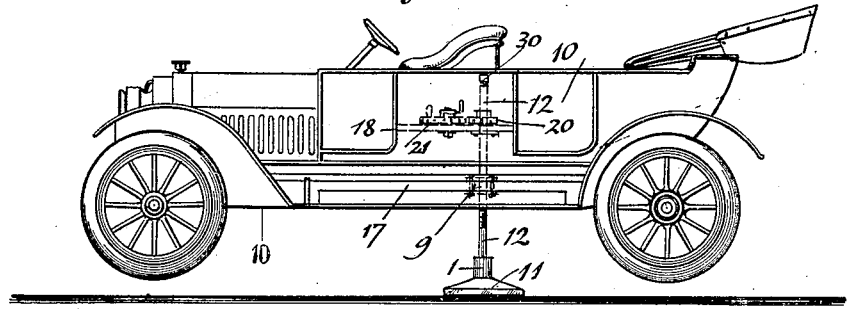
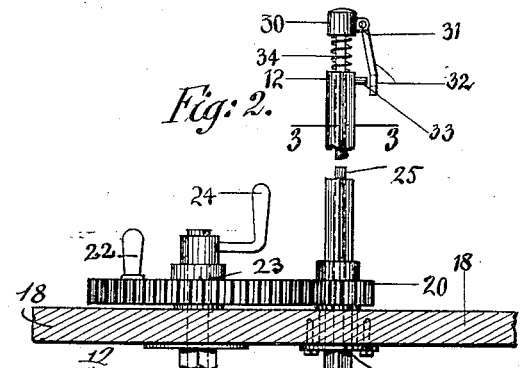
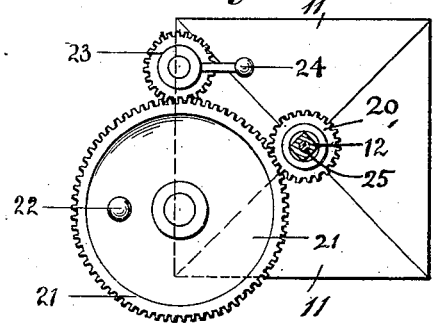
Witnesses:
John Murtagh
L. J. Murphy
Ferdinand Helder Inventor
By his Attorneys
Joepel & Goepel

UNITED STATES PATENT OFFICE.

FERDINAND HELDER, OF NEW YORK, N. Y.

TURN-TABLE ATTACHMENT FOR AUTOMOBILES.

1,061,073. Specification of Letters Patent. Patented May 6, 1913.

Application filed January 24, 1912. Serial No. 673,227.

*To all whom it may concern:*

Be it known that I, FERDINAND HELDER, a citizen of the United States of America, residing in New York, in the borough of Richmond, in the county of Richmond and State of New York, have invented certain new and useful Improvements in Turn-Table Attachments for Automobiles, of which the following is a specification.

This invention relates to an improved turn-table attachment for automobiles, by which an automobile or other vehicle can be readily turned on the spot for reversing its direction of motion without the chauffeur getting out of the vehicle for turning the same in connection with the turn-table attachment.

The invention consists more specifically of certain improvements in the turn-table attachment for automobiles, for which an application for Letters Patent was filed by me on Nov. 2, 1911, Serial No. 658,097, the improvement permitting the turning of the automobile on its axis by auxiliary mechanism arranged adjacent to the seat of the chauffeur so as to permit the reversing of the same without moving it backward and forward, while in the former application the chauffeur had to leave the car and turn it on the supporting-post by a turn-table arrangement for reversing it for changing its direction of motion; and for this purpose the invention consists of a turn-table attachment for automobiles and other vehicles in which the vehicle is provided at or near its center of gravity with a hollow supporting-post having a foot-piece swiveled thereto at its lower end in connection with means for lowering the supporting-post and foot-piece on the ground and raising the automobile on the post, and with means for locking the post to the foot-piece for producing in connection with a planetary gearing the turning of the automobile around the supporting-post after the same is locked in fixed position to the foot-piece until it is placed in the required position for reversing the direction of motion of the same.

The invention consists further of certain details of construction which will be fully described hereinafter and then pointed out in the claims.

In the accompanying drawings, Figure 1 represents a side-elevation of an automobile with my improved turn-table attachment, showing the automobile raised above the ground and ready for being turned. Fig. 2 is a detail side-elevation of the turn-table attachment, shown in vertical section through the frame or chassis and seat-portion of the automobile, and drawn on a larger scale. Fig. 3 is a plan-view of Fig. 2, showing the planetary gearing, said figure being partly in horizontal section on line 3—3, Fig. 2. Fig. 4 is a detail vertical central section through the lower portion of the supporting-post and foot-piece of the turn-table attachment, showing the key for locking the post rigidly to the foot-piece for permitting the turning of the automobile around the post after it has been raised above the ground. Fig. 5 represents a horizontal section on line 5—5 of Fig. 4. Fig. 6 represents a vertical longitudinal section of fragments of the socket and supporting post and side elevations of the key for locking said parts and of the actuating rod therefor, the key being in full lines in downward locking position and in dotted lines in upward unlocked position.

Similar reference characters indicate corresponding parts throughout the several figures of the drawings.

Referring to the drawings, 10 represents an automobile or other power-driven vehicle which is provided with my improved turn-table attachment. This attachment consists of a foot-piece 11 which is provided with an upright center-socket 1. In the socket 1 is supported the upright center-post 12 which extends to some distance into the socket and which rests by its lower conically-tapering end in a correspondingly shaped step of the foot-piece 11, anti-friction balls being arranged between the lower part of the supporting-post 12 and the socket 1 of the foot-piece, as shown in Fig. 4. The supporting-post 12 is cylindrical at its lower and middle portions, square at its upper portion and provided with a screw-thread at its middle portion 19. The screw-threaded middle portion 19 engages an interiorly-threaded sleeve 9 which is located in a hole of the bottom-frame or chassis 17 of the automobile, said sleeve being provided with flanges which are firmly bolted to the frame 17. The square upper portion passes through a sleeve 8 which is attached to the seat-frame 18 of the automobile, the upper portion being extended to some height above the seat-frame. The sleeve 8 is made cylindrical so as to permit the turning of the square upper portion of the supporting-post 12 in the same. The supporting-post 12 is preferably located approximately in or near the center of gravity of the car so that the proper balancing and turning of the same around the post is facilitated, when the automobile is raised above the ground. To the upper square end of the supporting-post 12, above the seat-frame 18, is keyed a pinion 20 which intermeshes with a gear-wheel 21 that turns on a fixed shaft applied to the seat-frame, said gear-wheel being provided with an upright handle 22 for turning the same and thereby the pinion 20 and the supporting-post 12.

The mechanism so far described constitutes the turn-table attachment and permits the lowering of the supporting-post and the foot-piece on the same until the latter arrives on the ground. On continuing the motion of the gear-wheel 21, the automobile is lifted on the threaded portion of the post until its wheels are sufficiently above the ground for permitting the turning of the automobile on the supporting-post, as shown in Fig. 1.

The supporting-post 12 is provided with a center-bore which extends from its upper end to its lower end located within the socket of the foot-piece. At the lower end of the bore a radial recess 6 is arranged in the post 12, in which recess is located a key 15 which is applied by a swivel-connection to the lower inclined end of a key-actuating rod 25 which extends throughout the entire bore of the post 12 and to the outside above the upper end of the same and which is provided at its upper end with a knob 30 and between the knob and the upper end of the post 12 with a helical spring 34 which serves to hold the key-actuating rod in raised position and the key out of engagement with interior recesses 14 of the socket 1 of the foot-piece. The swivel-connection of the key with the lower inclined end of the key-actuating rod 25 is formed of a yoke 27 applied to the key 15 and a ball-shaped end 26 at the lower end of the rod 25, a cushioning-spring 28 being interposed between the yoke 27 and a shoulder formed by the larger lower end of the rod 25, as shown clearly in Figs. 4 and 6.

The locking operation is accomplished by pressing down the knob 30 against the tension of its spring 34 and then locking the key-actuating rod 25 by a slotted rod 32 pivoted at 31 to the knob 30 to a lug 33 on the uppermost end of the supporting-post 12. When the key-rod 25 is pushed down, the corner of the key 15 which appears as the lower corner in Fig. 4 comes in contact with the bottom of the socket and causes said key to swing on its pivot into horizontal position as shown in Fig. 6 whereby the outer end of the key is thrust into engagement with one of the interior slots 14 of said socket causing the locking of the socket and post. This swinging of the key into horizontal position causes one corner of the lug thereof to contract the spring 23. When this has been accomplished, the body of the vehicle can be turned around the supporting-post by turning a second pinion 23 which is provided with a crank-handle 24 and which pinion also intermeshes with the gear-wheel 21 so that the latter is turned and moved slowly around the fixed pinion 20 on the supporting-post and as the pinion 23 and gear-wheel 21 are fixed to the seat-frame of the automobile, the latter follows the motion of the planetary gearing and turns around the axis of the supporting-post until its position is reversed and the automobile placed in the direction of motion in which it is intended to travel. As soon as the automobile has been turned around for the proper angle, the key 25 is unlocked from the sleeve of the foot-piece by disengaging the locking-rod 32 from the lug 33 and the key-actuating rod is immediately raised by its spring 34. This lifting of the rod permits the key 15 by its swivel-connection with the inclined lower end of the rod 25 to be swung under the action of the spring 28 out of engagement with the recess 14 of the socket of the foot-piece so that the supporting-post is now free to turn in the foot-piece for lowering the automobile to the ground. This is accomplished by turning the gear-wheel 21 and pinion 20 in the opposite direction so that the screw-sleeve 9 moves along the threaded portion 19 of the supporting-post 12 and returns thereby the automobile to the ground, and by continuing the turning motion of the gear-wheel raises the foot-piece to a sufficient height above the ground so as not to interfere with the movement of the vehicle.

The operating parts for lowering the foot-piece and raising the automobile on the supporting-post as well as the operating parts for locking the post to the socket of the foot-piece and then moving the automobile around the axis of the supporting-post until its position is reversed and the same placed into the proper direction of motion, are all arranged on the seat-frame of the vehicle adjacent to the seat of the chauffeur and preferably covered up in a suitable manner so as to be operated when required from the seat of the chauffeur without the latter being compelled to leave the automobile for performing the reversing motion, so that an efficient means is provided for raising the automobile and reversing without moving it backward and forward, and then lowering it again to the ground in a quick and effective manner.

I claim:

1. An improved turn-table attachment for automobiles, comprising a foot-piece, a supporting-post rotatable in said foot-piece, means for lowering the foot-piece to the ground and simultaneously raising the automobile in respect to the foot-piece, means for locking the supporting-post to the foot-piece, and a planetary gear for rotating the automobile around the supporting-post after the same is interlocked with the foot-piece.

2. An improved turn-table attachment for automobiles, comprising a foot-piece provided with an interiorly-recessed socket, a tubular supporting-post rotatable in said foot-piece and provided with a screw-threaded middle portion, an interiorly-threaded sleeve secured to the bottom-frame of the automobile for engaging said screw-threaded portion, a key-actuating rod arranged in the bore of the post, a key swiveled to the lower end of said key-rod and adapted to engage the interior recesses of said socket, means for raising or lowering the key-rod and placing the key into or out of mesh with the socket of the foot-piece, and a planetary gear for rotating the automobile around the supporting-post after the same is locked to the foot-piece.

3. A turn-table attachment for automobiles and other vehicles, comprising a foot-piece, provided with a socket having interior recesses, a tubular supporting-post rotatable in said socket, said post being provided with a screw-threaded middle portion and square upper portion, an interiorly-threaded sleeve attached to the bottom-frame of the vehicle and adapted to engage said screw-threaded portion of the post, a key-operating rod in the bore of the post, a key swiveled to the lower end of said rod, means for raising or lowering said rod and placing the key in or out of locking connection with the recesses in the socket of the foot-piece, a pinion on the square upper end of said supporting-post, a gear-wheel meshing with said pinion, and a second pinion intermeshing with the gear-wheel for turning the automobile after the same is lifted above the ground around the supporting-post and reversing its direction of motion.

In testimony, that I claim the foregoing as my invention, I have signed my name in presence of two subscribing witnesses.

FERDINAND HELDER.

Witnesses:
PAUL GOEPEL,
JOHN MURTAGH.

---

Copies of this patent may be obtained for five cents each, by addressing the "Commissioner of Patents, Washington, D. C."